United States Patent

[11] 3,610,602

[72] Inventors Alexander J. Deacon
  Chicago;
  Marshall J. McCullough, Hazel Crest, both of Ill.
[21] Appl. No. 866,316
[22] Filed Oct. 14, 1969
[45] Patented Oct. 5, 1971
[73] Assignee United States Steel Corporation

[54] GAS-PERMEABLE REFRACTORY PLUG AND METHOD
  7 Claims, 1 Drawing Fig.
[52] U.S. Cl. .................................................. 266/34 PP, 75/59
[51] Int. Cl. .................................................. C21c 7/04

[50] Field of Search ............................................. 266/34 R, 34 PP, 34 T, 41; 75/59

[56] References Cited
UNITED STATES PATENTS
3,490,755  1/1970  Lutgen .......................  266/34 PP Primary Examiner—Gerald A. Dost
Attorney—Walter P. Wood ABSTRACT: A permeable refractory plug through which gas can be introduced to liquid at high temperature. The structure around the permeable refractory tends to crack and channel the gas away from its intended path. Invention is to insert slabs of fusible viscous material, such as fused silica glass, around the plug. Slabs fuse and flow into any cracks and thus seal them.

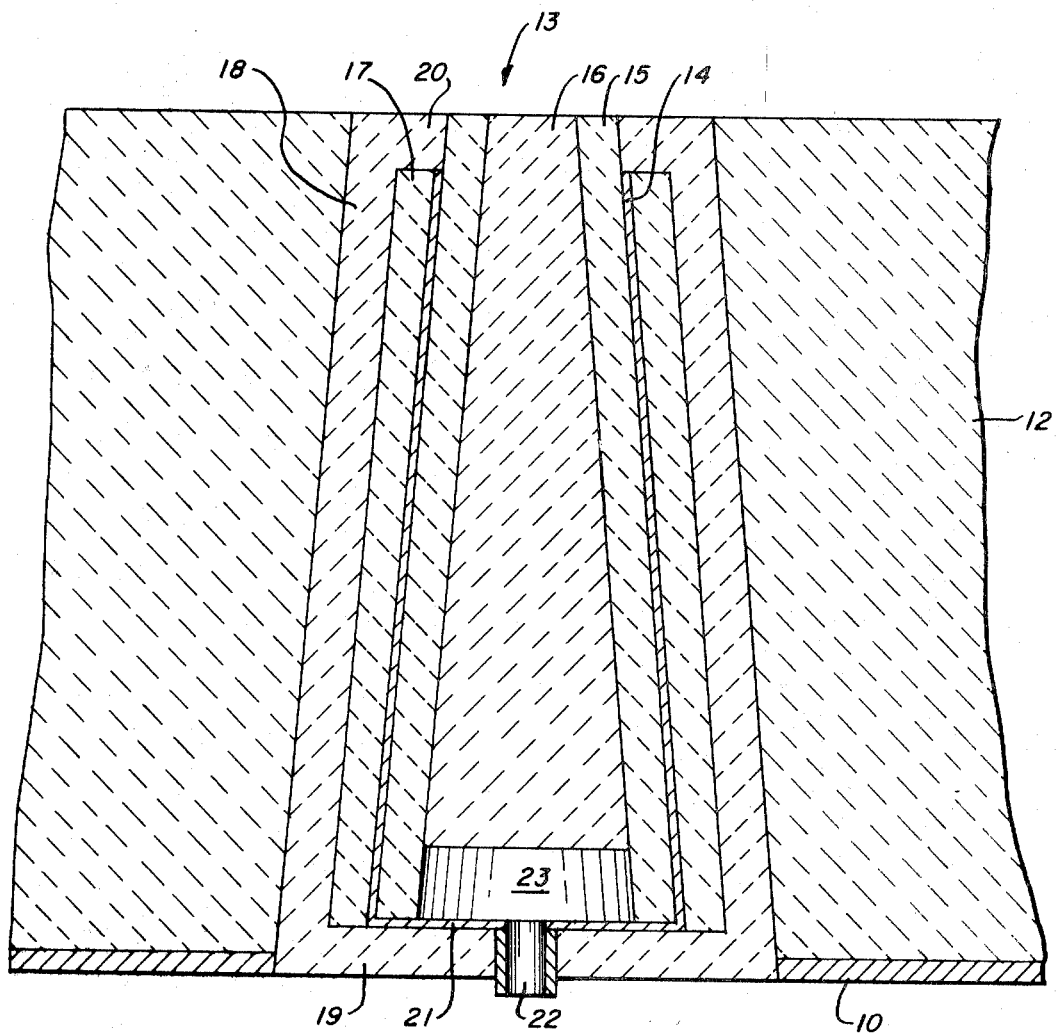

GAS-PERMEABLE REFRACTORY PLUG AND METHOD

This invention relates to an improved gas-permeable refractory plug through which a gas can be introduced to a liquid at high temperature, and to an improved method of introducing gas to such liquid.

Although our invention is not thus limited, our refractory plug and method are particularly useful for introducing a gas to molten metal in a ladle or the like. The use of permeable refractory plugs for this purpose is known, as shown for example in Spire U.S. Pat. Nos. 2,811,346 and 2,947,527. One problem encountered with such plugs is that the casing or wall structure surrounding the permeable refractory may crack. The cracks afford channels of less resistance to gas flow than the refractory and thus divert the gas from its intended path into the molten metal.

An object of our invention is to provide an improved plug and method which overcome the cracking problems heretofore encountered.

A more specific object is to provide an improved plug which embodies layers of fusible viscous material for automatically sealing cracks as they appear.

In the drawing:

The single figure is a vertical sectional view of a portion of a vessel wall which has a plug constructed in accordance with our invention installed therein.

The drawing shows a portion of a vessel wall which includes a metal shell 10 and a refractory lining 12. The vessel is adapted to contain a liquid at a high temperature, such as molten steel. A plug 13 constructed in accordance with our invention is mounted in the vessel wall. Gas is introduced to the liquid in the vessel through the plug in a manner which can be similar to that described in the aforementioned Spire patents.

Our plug includes a steel casing 24 within which we mold a refractory inner shell 15 and a permeable refractory core 16. We then cover the outside of the casing with slabs 17 of fusible viscous material and mold a refractory outer shell 18 over the slabs. We may form our core 16 of high alumina, grain sized and fired to provide the required permeability. We may form shells 15 and 18 of a dense high alumina grain with minimum permeability Slabs 17 may be a glass of high melting temperature, such as fused silica. The plug parts taper toward the discharge end of the plug, usually the upper end. The outer shell 18 has inwardly directed flanges 19 and 20 at the inlet and discharge ends respectively of the plug. The casing 14 has an inwardly directed flange 21 at the inlet end of the plug, to which we connect an inlet tube 22. We foreshorten the core 16 at the inlet end of the plug to provide a distribution chamber 23 within the inner shell 15.

According to our method of introducing gas through our plug, we supply gas under suitable pressure to the inlet tube 22. The gas travels through the permeable core 16 into the vessel. Stresses caused by movement of the refractory lining 12 of the vessel may cause cracks to appear in the casing 14 or outer shell 18. Temperature cycling inherent in a steelmaking process may cause similar cracking when we use our plug in a ladle or the like in which molten steel is handled. The parts are at a temperature sufficiently high that the slabs 17 fuse and form a viscous liquid which flows into any cracks and seals them. When the slabs fuse, flanges 19 and 20 serve to retain the internal parts of the plug in the proper position. Thus our invention effectively prevents gas loss through the walls and assures that gas enters the material in the vessel via the core 16.

We claim:

1. In a plug through which a gas can be introduced to a liquid at a high temperature, said plug including a core of permeable refractory, parts surrounding said core and being subject to cracking, and means for introducing gas to one end of said core to be discharged through the other end, the improvement which comprises fusible viscous material placed within said parts to flow into any cracks and seal them.

2. A plug as defined in claim 1 in which said parts include a steel casing, a refractory inner shell molded within said casing, said core being molded within said inner shell, and a refractory outer shell, said viscous material being in the form of slabs overlying said casing, said outer shell being molded over said slabs.

3. A plug as defined in claim 2 in which said outer shell has inwardly directed flanges at each end of the plug, said casing has an inwardly directed flange at the inlet end of the plug, and the means for introducing gas includes an inlet tube connected to said last-named flange.

4. A plug as defined in claim 3 in which said core is foreshortened at the inlet end of the plug to provide a distribution chamber.

5. A plug as defined in claim 1 in which said core is of high alumina, grain sized and fired to provide the required permeability, and said viscous material is a glass of high melting temperature.

6. A plug as defined in claim 2 in which said core is of high alumina, grain sized and fired to provide the required permeability, said shells are of a dense high alumina grain with minimum permeability, and said slabs are of fused silica glass.

7. The combination, with the wall of a vessel adapted to contain molten metal and having a metal shell and refractory lining, of a plug mounted therein for introducing gases to the molten metal, said plug being constructed as defined in claim 1.